United States Patent [19]

Kimbro

[11] 4,425,149

[45] Jan. 10, 1984

[54] METHOD OF MAKING A DRY COMPOUND CONTAINING CHELATED MICRONUTRIENTS AND THE CHELATING AGENT USED TO FORM THE COMPOUND

[76] Inventor: William S. Kimbro, P.O. Box 415, Bass Lake, Calif. 93604

[21] Appl. No.: 401,262

[22] Filed: Jul. 23, 1982

[51] Int. Cl.$^3$ ............................................... C05D 9/02
[52] U.S. Cl. ............................................. 71/24; 71/1; 71/64.11; 71/DIG. 2
[58] Field of Search .................... 71/24, 1, 63, 64.11, 71/DIG. 2; 424/19; 426/74

[56] References Cited

U.S. PATENT DOCUMENTS

| | | | |
|---|---|---|---|
| 3,264,084 | 8/1966 | Karcher | 74/24 |
| 3,418,100 | 12/1968 | Cooley | 71/24 |
| 3,544,296 | 12/1970 | Karcher | 71/24 |
| 3,607,211 | 9/1971 | Cole et al. | 71/1 |
| 4,084,938 | 4/1978 | Willard | 71/24 |
| 4,321,076 | 3/1982 | Firth | 71/24 |
| 4,377,599 | 3/1983 | Willard | 71/63 X |

*Primary Examiner*—Kenneth M. Schor
*Attorney, Agent, or Firm*—Vaden, Eickenroht, Thompson, Bednar & Jamison

[57] ABSTRACT

The invention disclosed is a method of making a chelating agent and a method of forming a chelated compound using that chelating agent. The chelating agent is formed in two steps. In the first step, methanol with a small amount of citric acid and concentrated nitric acid is used to remove whatever compounds in leonardite ore that is soluable in methanol. The resulting mixture is then mixed with sodium citrate and dried causing the methanol to evaporate. The result is a chelating agent. It is ground into a fine powder and can be mixed with finely ground powders of the sulfates of the desired micronutrients such as for example ferrous sulfate. The two powders when so mixed combined to form a chelate. The resulting dry material is then reground into a powder and can contain up to 22% of the chelated micronutrient.

4 Claims, No Drawings

METHOD OF MAKING A DRY COMPOUND CONTAINING CHELATED MICRONUTRIENTS AND THE CHELATING AGENT USED TO FORM THE COMPOUND

This invention relates to a method of making a dry compound containing chelated micronutrients and to the method of making the chelating agent employed to produce the compound.

The practice of adding chelated micronutrients to fertilizers for plants is well-known. The most commonly used chelating agent today is EDTA, which can be added to fertilizer without greatly upsetting the pH of the fertilizer or creating other problems.

EDTA however, is very expensive. There are other well known chelating agents such as humic acid, citric acid, and gluconic acid to name a few. They are less expensive than EDTA, but for one reason or another, they are not a satisfactory substitute for EDTA. The most common problem with these chelating agents is their instability in that they will not hold the micronutrients in a chelated state for any length of time, so their shelf life is very limited.

It is an object of this invention to provide a method of forming a chelating agent and a method of combining a chelating agent with the desired micronutrients that is very inexpensive to manufacture, easy to manufacture, and is stable and will provide a higher percentage of micronutrients in the compound than can be obtained by any known chelating agent at the present time including EDTA.

In accordance with the method of this invention, leonardite ore is mixed with a small amount of citric acid and a small amount of concentrated nitric acid and a relatively large amount of methanol. The mixture is stirred until the methanol has stripped from the leonardite ore all factions thereof that are soluble in methanol. The resulting mixture is then combined with sodium citrate on about a ratio of about 1 part by weight of the mixture to about 6 parts of weight of sodium citrate. This second mixture is stirred until the methanol has evaporated leaving a dry compound. This is the chelating agent.

To form a chelated product for adding to fertilizer, the chelating agent is ground to a fine powder. It is then mixed with the sulfate of the desired micronutrient, for example, ferrous sulfate if iron is to be the chelated micronutrient. The ferrous sulfate is mixed with the chelating agent in an amount to give the desired percentage of chelated iron. The ferrous sulfate is added to the chelating agent as a finely ground dry powder. When the two powders are mixed together, they react. The mixture tends to grow and change color as the chelating process takes place. Some heat is given off during this time. After the mixture has stopped growing and the color has stabilized, it will be necessary to regrind the mixture to a powder and this powder then is a compound containing chelated micronutrients of the desired percentage. There is a maximum percentage that can be chelated for each micronutrient.

The reaction of the two powders, the chelating agent and the sulfate of the micronutrient, is completely unexpected. There is also another result that is very unexpected and this is the high percentage of micronutrients that can be chelated with this chelating agent. For example, with ferrous sulfate, a compound containing 22% iron can be obtained. This is a much greater percentage than any other chelating agent has been capable of producing plus the fact that the product is very stable.

An example of the practice of the method of this invention is as follows: About 32% by weight leonardite ore, 3% by weight citric acid, about 1% by weight concentrated nitric acid, and about 64% by weight of methanol, were stirred together for about one hour to give the methanol ample time to strip whatever is soluble in methanol from the leonardite ore. This liquid was then mixed with sodium citrate at a ratio of 20% by weight of the liquid with about 80% by weight of sodium citrate. This mixture was then stirred until all or most all of the methanol had evaporated leaving a dry mixture. This is the chelating agent.

The chelating agent was then ground to a fine powder which was mixed with a finely ground ferrous sulfate at the ratio of 25% of the chelating agent and 75% by weight ferrous sulfate. This powdered mixture began to expand and to change color. After about a 24 hour period the mixture stabilized. It had quit growing and had stopped changing color. The color change was from gray green to a light brown. The result is a 15% chelated iron compound that can be stored in the dry state, shipped dry, then added to water to form a liquid which can be added directly to liquid fertilizers in the same manner as EDTA chelates are added to fertilizer.

For other micronutrients or for combinations of micronutrients, the chelating agent would be mixed with the selected sulfate of the particular micronutrient.

From the foregoing it will be seen that this invention is one well adapted to attain all of the ends and objects hereinabove set forth, together with other advantages which are obvious and which are inherent to the method.

What is claimed is:

1. A method of making a dry compound containing chelated fertilizer micronutrients, said method comprising the steps of mixing about 32% by weight leonardite ore, 3% by weight citric acid, 1% by weight concentrated nitric acid, and 64% by weight methanol; stirring the mixture about one hour; mixing about 20% by weight of the resulting mixture with about 80% by weight sodium citrate, to make a chelating agent; stirring the chelating agent until dry; grinding the chelating agent into a powder; mixing the powdered chelating agent with an amount of dry, powdered, sulfates of the desired micronutrients to produce the desired percentage of said chelated fertilizer micronutrients; allowing the mixture to stand until all reactions between the ingredients are substantially complete; and regrinding the resulting compound into a powder.

2. The method of claim 1 in which the desired sulfate is ferrous sulfate and in which the ratio of ferrous sulfate and chelating agent produces a compound containing 14–20% chelated iron.

3. A method of making a dry compound containing chelated fertilizer micronutrients, said method comprising the steps of mixing about 32% by weight leonardite ore, 3% by weight citric acid, 1% by weight concentrated nitric acid, and 64% by weight methanol; stirring the mixture about one hour; mixing about 20% by weight of the resulting mixture with about 80% by weight sodium citrate, to make a chelating agent; stirring the chelating agent until dry; grinding the chelating agent into a powder; mixing the powdered chelating agent with an amount of dry, powdered, sulfates of the desired micronutrients to produce the desired precentage of said chelated fertilizer micronutrients; allowing the mixture to stand until substantially all swelling and changes in color have occurred thereby indicating that all reactions between the ingrediants are substantially complete; and regrinding the resulting compound into a powder.

4. The method of claim 3 in which the desired sulfate is ferrous sulfate and in which the ratio of ferrous sulfate and chelating agent produces a compound containing 14–20% chelated iron.

* * * * *